(12) United States Patent
Magaldi et al.

(10) Patent No.: US 10,634,124 B2
(45) Date of Patent: Apr. 28, 2020

(54) ENERGY-EFFICIENT HIGH LEVEL DEVICE, PLANT AND METHOD FOR THE USE OF THERMAL ENERGY OF SOLAR ORIGIN

(71) Applicant: Magaldi Power S.P.A., Salerno (IT)

(72) Inventors: Mario Magaldi, Salerno (IT); Alberto Carrea, Genoa (IT); Gennaro Somma, Pagani (IT)

(73) Assignee: MAGALDI INDUSTRIE S.R.L., Rome (IT)

( * ) Notice: Subject to any disclaimer, the term of this patent is extended or adjusted under 35 U.S.C. 154(b) by 145 days.

(21) Appl. No.: 15/750,402

(22) PCT Filed: Jul. 28, 2016

(86) PCT No.: PCT/IB2016/054525
§ 371 (c)(1),
(2) Date: Feb. 5, 2018

(87) PCT Pub. No.: WO2017/021832
PCT Pub. Date: Feb. 9, 2017

(65) Prior Publication Data
US 2018/0230973 A1 Aug. 16, 2018

(30) Foreign Application Priority Data

Aug. 5, 2015 (IT) .................. 102015000042394

(51) Int. Cl.
*F03G 6/06* (2006.01)
*F22B 1/00* (2006.01)
(Continued)

(52) U.S. Cl.
CPC .............. *F03G 6/064* (2013.01); *F03G 6/06* (2013.01); *F22B 1/006* (2013.01); *F24S 10/20* (2018.05);
(Continued)

(58) Field of Classification Search
CPC .. F03G 6/06; F03G 6/064; F22B 1/006; F24S 10/20; F24S 2023/878; F24S 20/20;
(Continued)

(56) References Cited

U.S. PATENT DOCUMENTS

| 4,038,557 A | 7/1977 | Gildersleeve, Jr. et al. |
| 8,378,280 B2 * | 2/2013 | Mills ............... F24S 60/00 250/203.4 |

(Continued)

FOREIGN PATENT DOCUMENTS

| FR | 2453887 A1 | 11/1980 |
| WO | 2012049655 A1 | 4/2012 |

(Continued)

*Primary Examiner* — Jesse S Bogue
(74) *Attorney, Agent, or Firm* — Hunton Andrews Kurth LLP

(57) ABSTRACT

A device for storage and exchange of thermal energy of solar origin, which device is configured to receive a concentrated solar radiation using an optical system of "beam down" type, which device comprises: —a containment casing which defines an internal compartment and has an upper opening configured to allow entry of the concentrated solar radiation, which opening puts in direct communication the internal compartment with the external environment having no closure or screen means; —a bed of fluidizable solid particles, received within the internal compartment, which bed has an irradiated operative region directly exposed, in use, to the concentrated solar radiation that enters through said opening and a heat accumulation region adjacent to said operative region; —fluidization elements of the bed of particles, configured to feed fluidization air within the compartment, which fluidization means is configured to determine different fluid-dynamic regimens in the operative region and in the accumulation region, based upon different fluidization speeds, wherein, in use, the particles of the operative region (Continued)

absorb thermal energy from the solar radiation and they give it to the particles of the accumulation region.

27 Claims, 7 Drawing Sheets

(51) Int. Cl.
 *F24S 20/20* (2018.01)
 *F24S 10/20* (2018.01)
 *F24S 60/00* (2018.01)
 *F24S 23/70* (2018.01)
 *F24S 80/20* (2018.01)

(52) U.S. Cl.
 CPC ............... *F24S 20/20* (2018.05); *F24S 23/70* (2018.05); *F24S 60/00* (2018.05); *F24S 80/20* (2018.05); *F24S 2023/878* (2018.05); *Y02E 10/41* (2013.01); *Y02E 10/44* (2013.01); *Y02E 10/46* (2013.01); *Y02P 90/50* (2015.11)

(58) Field of Classification Search
 CPC . F24S 23/70; F24S 60/00; F24S 80/20; Y02E 10/41; Y02E 10/44; Y02E 10/46; Y02P 90/50
 See application file for complete search history.

(56) References Cited

U.S. PATENT DOCUMENTS

| | | | |
|---|---|---|---|
| 8,420,032 B1* | 4/2013 | Ermanoski | B01J 8/087 422/630 |
| 8,540,962 B2* | 9/2013 | Kodama | C01B 3/061 422/139 |
| 8,960,182 B2* | 2/2015 | Magaldi | F24S 20/20 126/617 |
| 9,157,660 B2* | 10/2015 | Taylor | F24S 23/31 |
| 9,732,986 B2* | 8/2017 | Al-Ansary | F24S 10/80 |
| 10,260,014 B2* | 4/2019 | Kodama | C10B 23/00 |
| 2015/0090251 A1* | 4/2015 | Magaldi | F03G 6/06 126/714 |
| 2019/0360724 A1* | 11/2019 | Magaldi | F24S 20/20 |

FOREIGN PATENT DOCUMENTS

| | | |
|---|---|---|
| WO | 2012153264 A2 | 11/2012 |
| WO | 2014038553 A1 | 3/2014 |

* cited by examiner

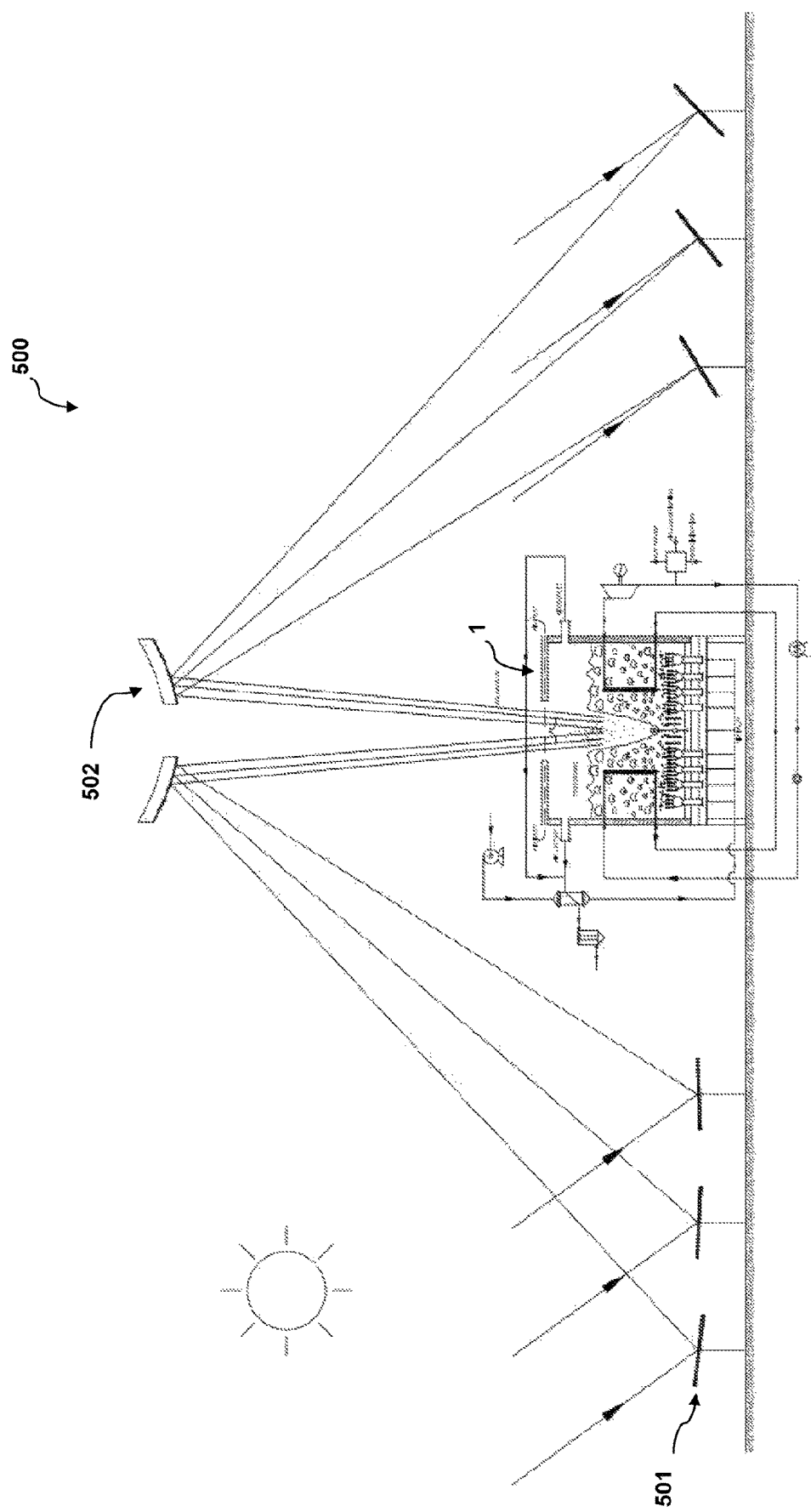
FIG. 1bis

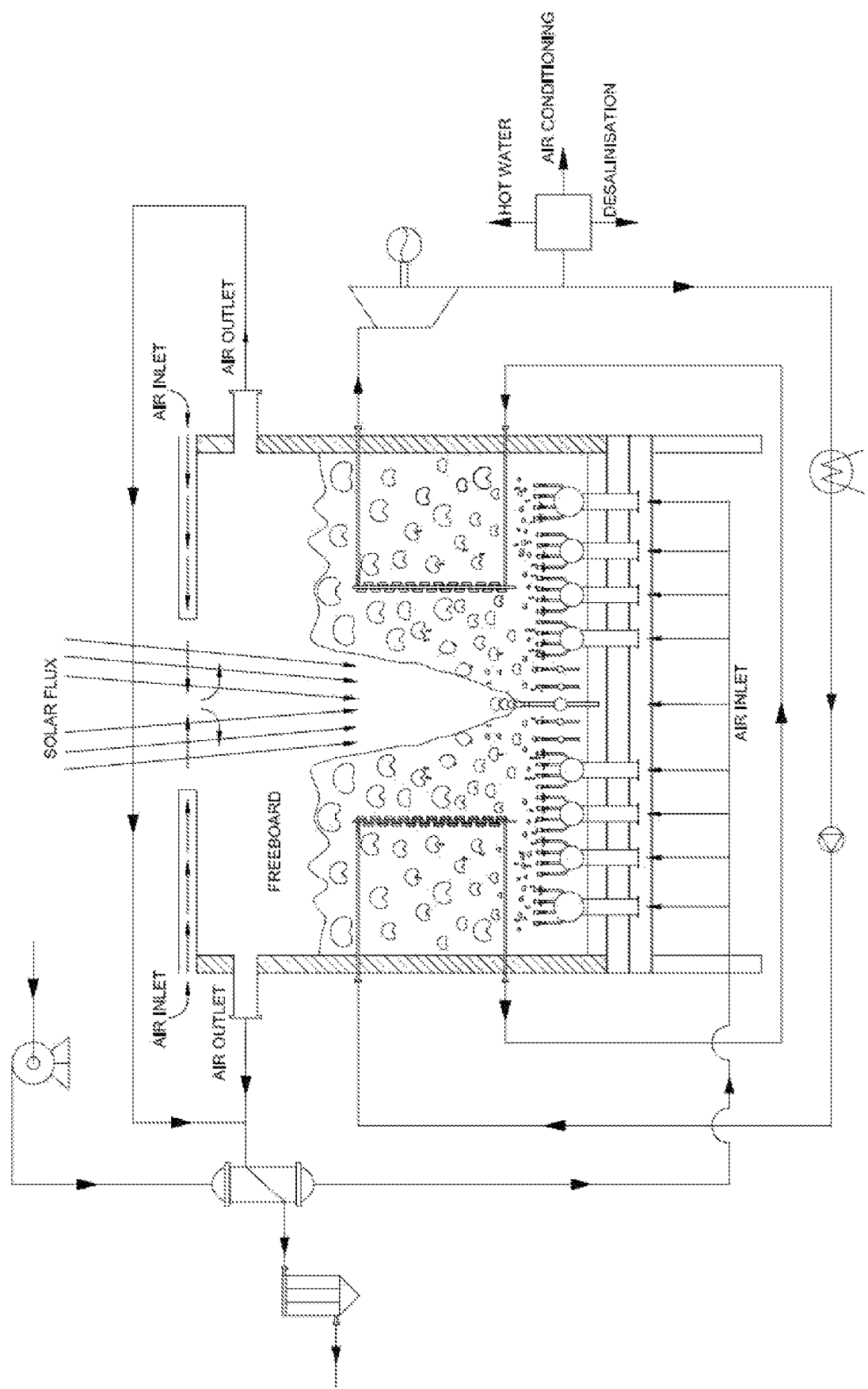
FIG. 1ter

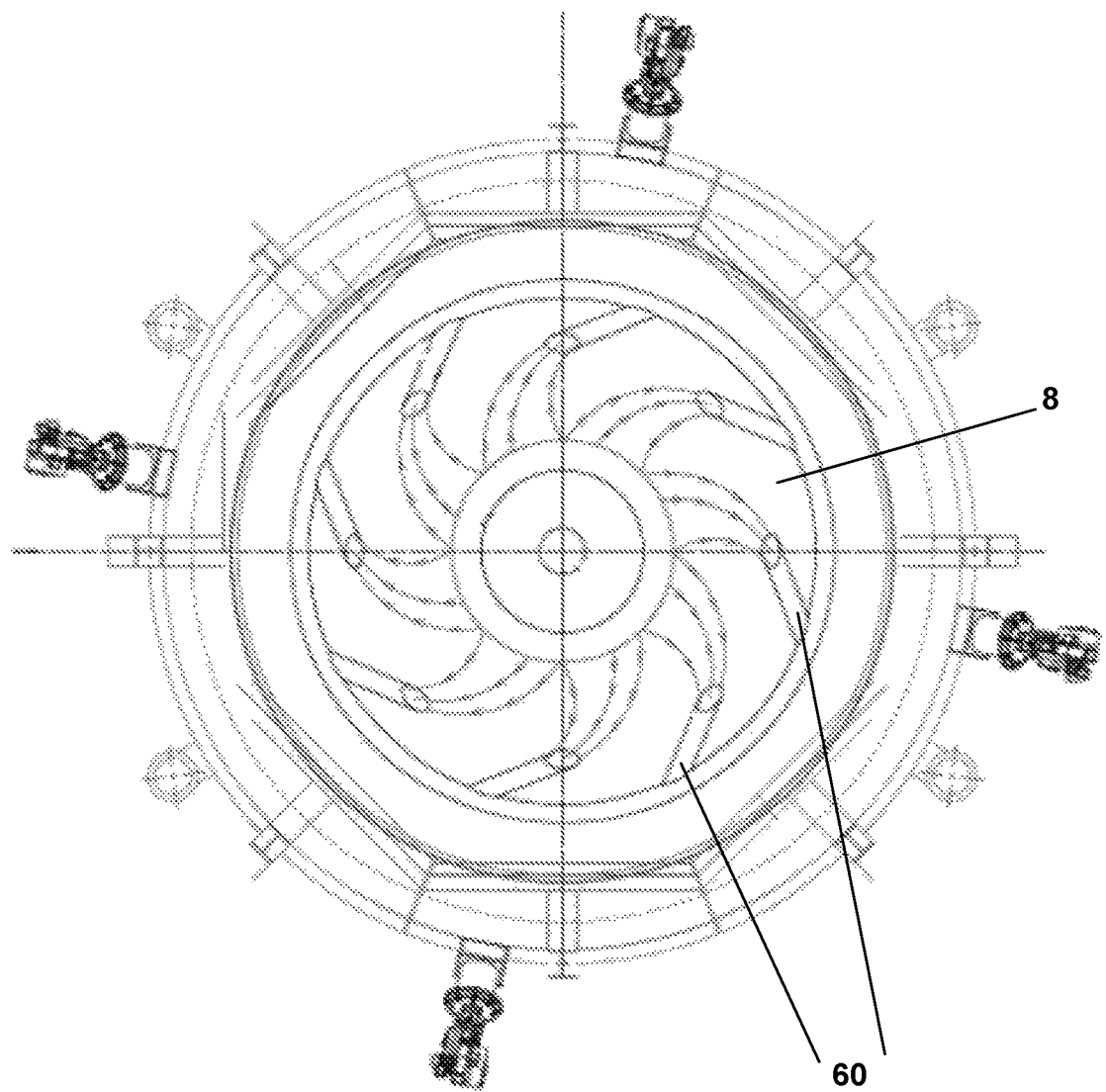
FIG. 2bis

ENERGY-EFFICIENT HIGH LEVEL DEVICE, PLANT AND METHOD FOR THE USE OF THERMAL ENERGY OF SOLAR ORIGIN

CROSS REFERENCE TO RELATED APPLICATIONS

This application is a U.S. National Phase of International Patent Application PCT/IB2016/054525, filed Jul. 28, 2016, which claims priority to Italian Patent Application No. 102015000042394, filed Aug. 5, 2015, the disclosure of each of which are hereby incorporated by reference.

TECHNICAL FIELD OF THE INVENTION

The present invention relates to a device for storage and exchange of thermal energy of solar origin based upon a bed of fluidizable particles. The invention further provides an energy production plant including such device and a related method.

BACKGROUND

The collection of solar energy by means of heliostats, which concentrate the radiation on reflector-mirrors, is known technique. The latter, in turn, convey the radiation on thermal storage and exchange devices based upon fluidized particle beds. A system of this type is described, for example, in WO2013/150347A1 in the name of the same owner.

Plants for the production of thermal/electrical energy can be based upon such devices for storage and exchange of thermal energy of solar origin, which plants will include one or more units for storage and/or exchange according to the thermal power one wants to obtain.

The fluidized-bed devices of known technique are implemented according to two main structures.

Based upon a first structure, described in WO2013/150347A1, the solar radiation is received on the walls of a metal cavity of the device. Such cavity defines a portion of the casing of the bed of particles and it extends inside the latter. The fluidized bed of particles subtracts the thermal energy deriving from the concentrated solar radiation from the cavity walls.

In presence of high incident radiative flows, the just described structure has the drawback of exposing the cavity surface to high thermal temperatures and gradients which could compromise the thermo-mechanical resistance and durability. In order to lower and control the thermal flows thereto the cavity walls are exposed, the heliostat field can be organized in several sub-sections arranged around the device and configured to uniform the thermal flows on the cavity surface. However, such configuration of the heliostat field requests a considerable ground occupation for each solar generation unit.

Furthermore, the described structure puts limits to the maximum operating temperature of the storage and exchange device, as this depends upon the thermal resistance of the material constituting the cavity walls. Such operating temperature is also conditioned by the mode for transferring the thermal energy from the cavity to the bed of particles and by the conductivity of the material constituting the cavity itself.

In a second known structure, the above-mentioned cavity is not provided and the bed of particles of the storage and exchange device receives the solar radiation concentrated through a window of transparent material, typically quartz, obtained on the casing of the device.

However, a criticality of such second structure consists in that the direct contact of the transparent window with the fluidized solid has to be avoided, and this to limit the appearance, in time, of delustring phenomena of the transparent material which reduce the reception effectiveness thereof.

An additional disadvantage related to the use of receiving means of the type with transparent window is related to the difficulty of producing windows in quartz with larger sizes than those used for plants of laboratory or of prototype kind.

Moreover, an additional drawback associated to both above-mentioned structures—and in particular to related receiving means with cavities or windows—consists in the thermal losses due to the re-release towards the outer environment of a portion of the incident solar energy. Such portion depends upon the features of the material constituting the receiving means.

As a consequence of what just noted, the above-mentioned devices for storing and transferring thermal energy of solar origin can have high costs for producing the electrical energy, however far from a so-called "parity grid".

SUMMARY OF THE INVENTION

The technical problem placed and solved by the present invention is then to provide a device for storing and transferring thermal energy of solar origin allowing to obviate the drawbacks mentioned above with reference to the known art.

Such problem is solved by a device according to claim 1.

The invention further provides a plant according to claim 17 and a method according to claim 18.

Preferred features of the present invention are subject of the depending claims.

The invention provides a device for receiving, storing and transferring thermal energy of solar origin based upon a fluidized bed of particles. The latter is irradiated, that is struck, in direct way by the concentrated solar radiation, without interposition of receiving means such as for example cavities or transparent windows. In other words, the fluidized bed is directly in communication with the external environment by means of an irradiation opening obtained in a casing of the device, preferably at an upper wall of the casing itself.

Therefore, the device of the invention does not provide a transparent window, or other structures, interposed between the outer environment/the incident solar radiation and the bed of particles.

Advantageously, the device is associated to an optical system, the latter constituted by primary heliostats and secondary reflecting means, for example plane mirrors. Such optical system concentrates the solar radiation on the device, in particular on an operative region of the bed arranged at the above-mentioned irradiation opening.

In an advantageous configuration, the irradiation is from the top and obtained by means of an optical system of so-called "beam down" type. The latter includes a heliostat field, placed onto the ground, associated to one or more secondary reflectors arranged at a height, in particular above the device.

The above-mentioned operative region of the bed of particles directly irradiated by the incident solar radiation is fluidized according to a specific fluid-dynamic, that is hydro-dynamic, regimen. Therefore, the device comprises, or is associated to, a system for distributing and feeding a fluidizing gas, preferably air. Such distributing system can be arranged at the basis of the bed of particles and it is suitable to establish said fluid-dynamic regimen at the irradiated bed region.

The above-mentioned means for distributing or feeding the fluidization air is configured so as to produce a differentiated fluidization, and then a different fluid-dynamic regimen, in the operative region with respect to the remaining portion of the bed, the latter designatable as accumulation region. Such different fluid-dynamic regimen is associated to a different fluidization speed of the two regions of the bed.

Based upon a first embodiment variant, such different fluidization speed is controlled so as to produce a hollow volume within the operative region, in particular in conical or substantially conical shape.

In a second variant, even within the operative region differentiated fluidization speeds are provided, so as to produce a circulatory convective motion of the particles. The latter migrate with continuity, that is they re-circulate, between adjacent sub-regions of the operative region.

Based upon a third embodiment variant, the above-mentioned fluid-dynamic regimen is (also) obtained with a physical partition interposed between the irradiated region and the accumulation region. Even in this case, a convective motion and a change/recirculation of particles above and below the partition between the two regions is produced.

Embodiment variants can provide a selection, in a same device, of the type of fluid-dynamic regimen to be established in the above-mentioned two regions, and this by means of a differentiated control of the fluidization speeds depending upon the specific operating needs.

The fluidization conditions induced at the operative region of the bed struck by the concentrated solar radiation are so as to guarantee high distribution of the thermal energy of solar origin in the whole volume of the region itself. Such bed region absorbs the thermal energy deriving from the solar radiation concentrated by the dedicated optical system.

Thanks to the differentiation of the fluid-dynamic regimen of the operative region with respect to the accumulation region, the exchange of the particles directly exposed to the solar radiation and a transfer and distribution of the thermal energy to the accumulation region is allowed.

In a preferred configuration, the device comprises, or is associated to, means for extracting the fluidization air coming out from the top of the bed of particles, in particular at the irradiated bed region. Such extraction means typically is configured as suction means.

The means for extracting air can be configured to keep the environment inside the device and above the freeboard of the bed of particles (that is the so-called "freeboard" space) in pressure equilibrium with the external environment or, preferably, in slight depression with respect to the latter. In this way, such means avoids the outgoing towards the outer environment of air and possible powder of the bed of particles.

Advantageously such pressure equilibrium can be assisted by control means, for example flow sensors, dedicated both to the fluidization air line and the air extraction line, so that the air flow extracted from the bed is slightly higher than (for example by 10%) the fluidization air inlet in the bed of particles.

The air which from the environment goes back to the device through the entry opening of the concentrated solar radiation heats up in the passage through said opening introducing a thermal content to the air extracted from the device.

Still advantageously, based upon the thermal content of the fluidization air outgoing from the device, the means for distributing the entering fluidization air and the means for extracting the outgoing fluidization air can be implemented as synergic systems which exchange heat, thus by implementing a regenerative phase. In particular, the extracted fluidization air, heated by the previous passage through the particles of the bed, can be sent to a regenerative exchanger which pre-heats the fluidization air then sent to the system for distributing/feeding air within the bed of particles. In other words, the air entering in the bed of particles pre-heats up at the expense of the thermal content of the air outgoing therefrom.

Based upon a preferred embodiment variant, the above-mentioned space inside the casing rising beyond the freeboard of the granular bed is configured to carry out the function of plenum chamber with respect the motion of the particles of the bed induced by the fluidization.

In addition or in alternative to the above-mentioned containment system of the environment inside the device with respect to the outer environment based upon the air-extracting means, an air-inletting system can be provided at the opening of the casing. The entered air flow is configured to contrast, like an air knife, the outgoing towards the outside of the fluidization air coming out from the bed.

In an embodiment variant—as additional or alternative tricking device for controlling the losses of the granular material towards the outer environment—preferably a containment structure is provided, arranged at the irradiation opening. Such containment structure can be configured as a diverging conus and be integral to the casing or integrated therewith.

Even the containment structure fulfils the function of plenum chamber, of portion of a plenum chamber or an additional plenum chamber, to reduce drastically the surface speed of the fluidization air and the solid particles ejected above the freeboard of the bed.

Preferably, in case of conical containment structure, the above-mentioned extracting means comprises a plurality of suction outlets developing orthogonally to the conus axis. The outlets suck-in the air and fine powders suspension and they can convey it, by means of a dedicated suction system, to a related treatment system. Such outlets can even be in communication with the freeboard environment and in this case they convey the suspension inside the freeboard, or better in the portion thereof outside the inner department defined by the conus. In any case, the action of the outlets produces a motion field of the sucked air opposing to the ascending flow of the solid suspension.

The device of the invention typically comprises, or is associated to, heat exchange elements dipped in the granular bed, in particular arranged in the above-mentioned accumulation region. Such elements can include tube bundles, preferably crossed by an operating fluid at least in selected phases of the device operation.

With respect to the indirect-irradiation devices of known art, the device of the invention allows to transfer directly the incident radiative power to the fluidized solid without interposition of walls or other barriers. It follows that the maximum temperature obtainable is limited exclusively by the properties of the fluidized solid and therefore it is intrinsically higher than the one tolerable in the known systems with indirect irradiation.

Furthermore, the direct transfer of the incident radiative power to the fluidized solid takes place without interposition of transparent windows, the latter potential sources for dirtying and depositing powders with consequent delustring, increase in temperature and establishing of thermal gradients. The absence of windows contributes to give the device of the invention a higher strength and durability.

Furthermore, even the advantages of the device of the invention in the application of an industrial plant for the production, for example, of electrical energy, are numerous.

First of all, the absence of means for receiving the concentrated solar radiation allows increasing the working temperature of the fluidized bed. The most immediate consequence of this event is a considerable increase in the thermal performance of the device.

Once having fixed the heat quantity which one wants to accumulate, that is having fixed the solar multiple (ratio between the transferred power and the accumulated power) the possibility of increasing the operating temperature of the bed of particles even involves the decrease in the particle load. More in details, once having fixed the quantity of thermal energy "Q" which one wants to accumulate, it is proportional to the mass of the solid "m" and to the temperature variation "$\Delta T$" thereof ($Q \ast m\Delta T$). With respect to a plant of known art, then, since the bed of particles can reach higher temperatures, the temperature delta ($\Delta T$) can increase and the solid mass can decrease.

Furthermore, as there is no physical resistance associated to the receiving means, it is possible to have a configuration of the concentrated radiative beam not necessarily uniformly distributed on a circular ring.

Depending upon what just illustrated, even in case of optical system of "beam down" type, the primary heliostat field and the secondary reflector(s) can be re-positioned so as to obtain a higher effectiveness in occupying the ground.

Additional advantages, features and use modes of the present invention will be evident from the following detailed description of some embodiments, shown by way of example and not for limitative purposes.

BRIEF DESCRIPTION OF THE FIGURES

The figures of the enclosed drawings will be referred to, wherein:

FIG. 1*bis* shows a schematic representation of the device of FIG. 1 inserted in a energy production plant complete with optical system;

FIG. 1*ter* shows an enlarged view of some components of FIG. 1*bis*, by referring in particular to the device of FIG. 1 and to some plant components;

FIG. 2*bis* shows a schematic top view of the device of FIG. 2;

The sizes and tilting shown in the above-mentioned figures are to be meant as pure way of example and they are not necessarily represented in proportion.

DETAILED DESCRIPTION OF PREFERRED EMBODIMENTS

Various embodiments and variants of the invention will be described hereinafter, and this by referring to the above-mentioned figures.

Analogous components are designated in the different figures with the same numeral reference.

In the following detailed description, additional embodiments and variants with respect to embodiments and variants already treated in the same description will be illustrated limitedly to the differences with respect to what already illustrated.

Furthermore, the different embodiments and variants described hereinafter are subject to be used in combination, when compatible.

Figure 1:
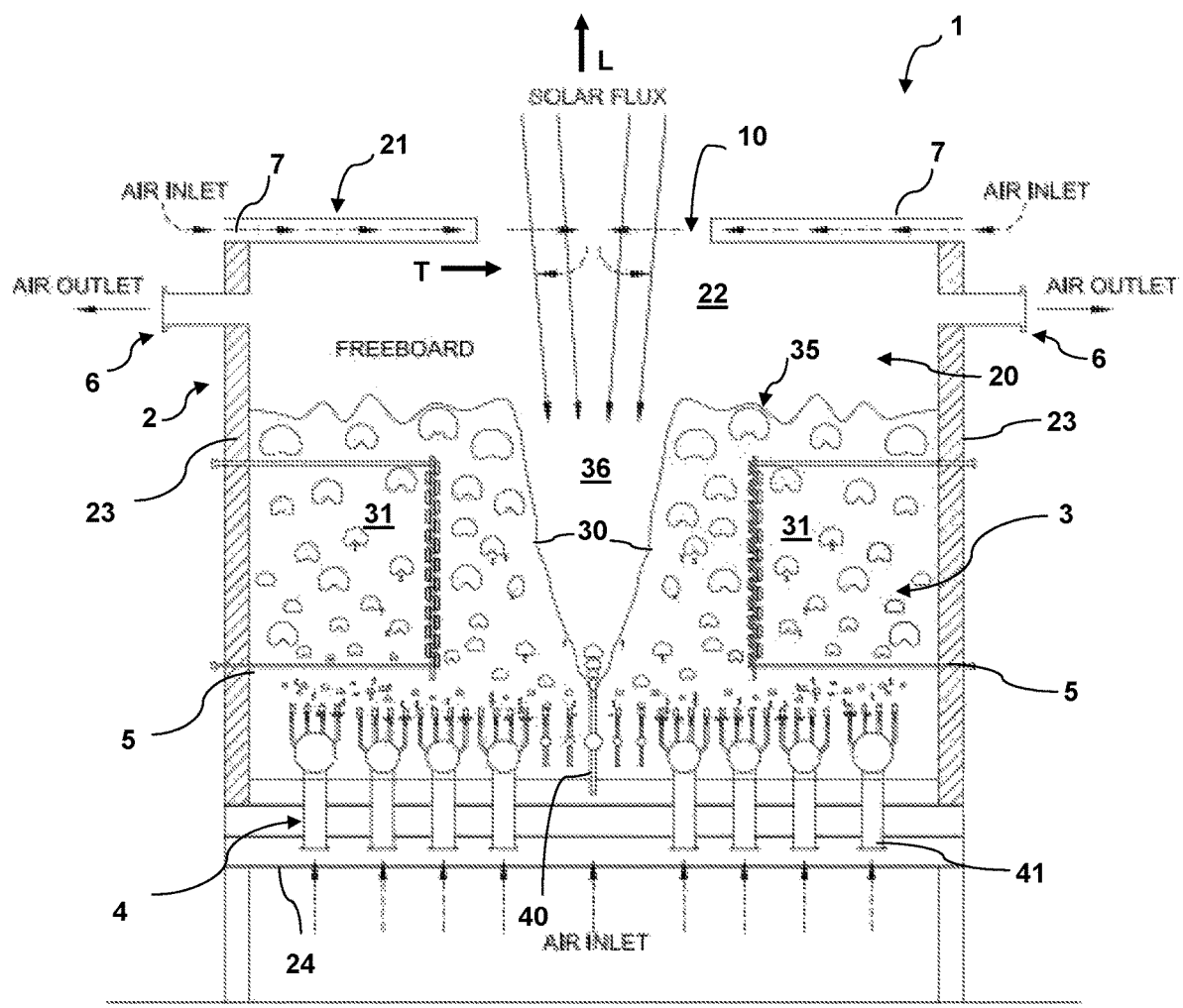
FIG. 1 shows a schematic view in longitudinal section of a device for storing and exchanging thermal energy of solar origin according to a first preferred embodiment of the invention.

By referring to FIG. 1, a device for storing and exchanging thermal energy of solar origin according to a first preferred embodiment of the invention is designated as a whole with 1.

As shown in FIGS. 1*bis* and 1*ter*, the device 1 of the present embodiment is meant to be inserted in an energy production plant 500, in case including a plurality of devices as the one considered herein.

The plant 500 comprises an optical system configured to focus an incident solar radiation on the device(s) 1. Each device can be associated to its own optical system. Advantageously, such optical system has a "beam down" configuration. In particular, the optical system can comprise a plurality of primary heliostats 501, or equivalent primary optical elements, arranged on the ground and suitable to collect the solar radiation to deviate/concentrate it on secondary reflecting mirrors 502, or equivalent secondary optical elements. The latter are arranged at a height, above the device or the devices 1 arranged on the ground, and they indeed convey the solar radiation onto the device(s) itself (themselves).

The plant 500 can then include, as shown schematically in FIG. 1*ter*, components for exchanging heat or transforming energy and circuit elements, for example one or more pumps, turbines, capacitors and so on.

By referring again to FIG. 1, the device 1 first of all comprises a containment casing 2, which defines an internal compartment 20, the latter suitable to house a bed of fluidizable particles 3 thereabout one will speak shortly. The casing 2 can have polygonal, for example cubic or parallelepiped, or cylindrical geometry.

With respect to the geometry of the device 1, we can define a longitudinal direction L, in the present example vertical, and a transversal direction T, orthogonal to the longitudinal direction L and in this example, then, horizontal.

The casing 2 has an irradiation opening 10, preferably arranged at its own upper wall 21. The above-mentioned secondary reflectors 502 concentrate the incident solar radiation indeed entering such opening 10 and within the compartment 20.

The opening 10 puts in direct communication the internal compartment 20, and then the bed of particles 3 housed therein, with the external environment. In particular, the opening 10, in use, is devoid of closure or screen means such as for example transparent windows or other. In other words, the device 1 is configured to work without closure or screen means. During not operating periods, the opening can be shielded to protect the system and the outer environment.

The bed of fluidizable particles 3 is of granular type, that is formed by solid particles.

The preferred type of granular material for the bed of particles of the device 1 is of the type with thermal features of high conductivity and thermal diffusivity and in particular with poor abrasiveness, so as to minimize the production of fine material. An example of preferred granular material is the river sand, which, apart from having suitable thermal features, has a natural rounded shape of the particles which minimizes the phenomenon of the mutual abrasion between the same.

The bed 3 occupies the internal compartment 20 so as to leave, even in use, a free space 22, or freeboard, above its own freeboard 35. In particular, the space 22 is delimited on the lower side by the freeboard 35 and on the upper side by the wall 21 of the casing 2.

The bed 3 defines a first region of bed 30 which is apt to be directly irradiated, that is struck, by the solar radiation that enters through the irradiation opening 10. Such first region 30 will be called operative or irradiated region. The remaining portion of the bed, surrounding and adjacent to the operative region 30, defines a heat accumulation region 31.

In general terms, the operative region 30 is arranged centrally of the bed 3 and the accumulation region 31 surrounds it and it is longitudinally adjacent it.

The bed of particles 3 is placed in motion by means fluidization means 4 configured to feed a fluidizing gas, in particular air, within the compartment 20. In the present embodiment, the means 4 comprises a plurality of elements for feeding or entering fluidization air, arranged at a lower base 24 of the casing 2 that is of the bed of particles 3. The route of the fluidization air within the bed of particles 3 is then from the bottom to the top, in particular vertical or substantially vertical.

In the present example, such feeding elements are arranged—and then they feed air—both at a base of the accumulation region 31 and at a base of the operative region 30. In FIG. 1, a feeding element of a first type, arranged at the operative region 30, is designated with 40, whereas a feeding element of a second type, associated to the accumulation region 31, is designated with 41.

The two types of feeding elements can differ for speed, and in case for rate, of the flow of fluidization air entering the bed of particles 3. Such elements 40 and 41 can even result to be structurally analogous therebetween and controlled differently in terms of speed and/or rate.

The means 4 is configured to determine a first fluid-dynamic fluidization regimen of the operative region 30 different from a second fluid-dynamic fluidization regimen of the accumulation region 31. In particular, such first and second fluid-dynamic regimens are based upon different fluidization speeds.

In the present embodiment, in use both the first and the second fluid-dynamic regime provide a motion of the particles, and then a fluidization thereof. In particular, in the present example the fluidization regimen is of spouted type, for example with jet, fountain or pulse, for the operative region 30 and of boiling type for the region 31, as represented schematically by means of air bubbles A in FIG. 1.

The fluidized bed of spouted type generally is a fluidized bed wherein the hydrodynamic regimen is characterized by a central jet of fluidizing gas at the base of the same bed which, due to the strong difference in surface speed between the minimum fluidization and the operating one, establishes a motion dragged by the column of the bed which insists on the jet itself and the overlooking (cylindrical) areas by creating, indeed, a fountain-like effect in the central portion fed by the solid dragged in the side portions of the jet.

Embodiment variants can provide that the particles of the accumulation region 31 remain, at least partially, stationary.

The different fluid-dynamic regimens allow an effective heat exchange of the particles of the operative region 30 with those of the accumulation region 31. Furthermore, the particles belonging to the two regions are subjected to a continuous exchange and recirculation. In particular, in use the particles of the operative region 30 absorb thermal energy from the solar radiation and they give it to the particles of the accumulation region 31.

In the herein considered specific embodiment, the fluidization means 4 is configured to determine, in use, a fluid-dynamic regimen of the operative region 30 so as to obtain in said region a hollow volume 36. The latter typically has substantially conical shape, with larger section at the freeboard 35 and axis according to the longitudinal direction L.

In the present example, the feeding element 40—arranged centrally of the operative region 30—introduces fluidization air at a speed so as to produce said hollow volume 36 receiving the solar flow. The exchange of particles from the operative region 30 to the accumulation one 31—which allows to maximize the surface of particles exposed to the concentrated solar radiation—is determined by the lower speed of the fluidization air, that is different density, of the accumulation region 31 adjacent to the hollow volume 36.

Heat exchange elements 5 are housed within the accumulation region 31, in particular tube bundles. Through such tube bundles, under selected operating conditions, that is under some use conditions, an operating fluid can run, for example water at the liquid and/or vapour state.

In particular, in a thermal exchange phase, that is a phase of using the retained thermal energy, the operating fluid can be made to flow in the tube bundles 5 and to receive heat from the particles of the accumulation region 31. On the contrary, during a phase of accumulation only, the tube bundles 5 can work dry, that is without operating fluid.

The accumulation phase can be activated in presence of the sun. The phase of thermal exchange, that is of transferring of the thermal energy to the operating fluid, can be activated even in absence of sun.

The fluidization of the bed of particles 3 or of a region thereof 30 or 31 can take place even during the accumulation phase only.

The operating fluid outgoing from the device 1 under design temperature and pressure conditions can be make to expand in a turbine coupled to a generator for the production of electrical energy or it can be used for other industrial purposes. In other words—and as already highlighted above—the tube bundles 5 are connected to additional components of the plant 500, for example one or more turbines, capacitors, heat exchangers, and so on, each one known on itself.

The device 1 further comprises suction means 6 for suction of the fluidization air which has ended its own route within the bed of particles 3. Such suction means 6 is arranged within the casing 2 above the freeboard 35 of the bed of particles 3. The suction means 6 is configured to avoid the inlet, or a massive inlet, of fluidization air and/or of the particles dragged thereby in the outer environment through the opening 10.

In the present example, the suction means 6 is configured to subtract air from the free space 22 at an upper portion of a side skirt, or side walls, 23 of the casing 2.

Advantageously, the suction means 6 provides (not illustrated) control means, preferably flow sensors, which in synergy with additional (not illustrated) control means associated to the fluidization means 4 determines an air flow extracted by the device 1 equal or higher than the flow of fluidization air inlet into the bed of particles.

In the second case, the suction means causes an air return from the environment into the device through the inlet opening 10 of the concentrated solar radiation. Such air heats up in the passage through the inlet opening 10, by enriching with a thermal content which is brought to the air extracted by the device 1.

Advantageously, the device 1 provides a heat exchange between the (heated) fluidization air outgoing from the bed of particles 3 at the freeboard 35 of the latter and sucked by the means 6 and the fluidization air entering the bed of particles 3 by means of the fluidization means 4. In other words, a heat regeneration is provided, obtained by means of thermal exchange means.

In the present embodiment, the device 1 has a plenum chamber at the freeboard 35 of the bed of particles 3. Such plenum chamber is meant as area of low, or null, speed for the particles of the bed and it is defined, in the present example, by the free space 22.

Even the plenum chamber 22 contributes to avoid an outgoing, or massive outgoing, of air and/or particles through the opening 10.

In the present embodiment, the device 1 further comprises inletting means 7 for inletting a containment gas, in particular air, in form of a laminar flow. The latter is suitable to produce an (additional) barrier to the outgoing of particles towards the outside.

The means 7 is arranged above the freeboard 35 of the bed of particles 3, in particular at the irradiation opening 10. Preferably, the arrangement is so that the laminar flow is emitted exactly at the opening 10, parallelly to the development cross direction T of the latter, to form a kind of closure gaseous window of the latter.

Embodiment variants can provide a plurality of irradiation openings. In case of multiple openings, each one will follow the valid attitude for the case of single opening as described herein. The different openings can be associated to a common operative region or to different operative regions.

Figure 2:
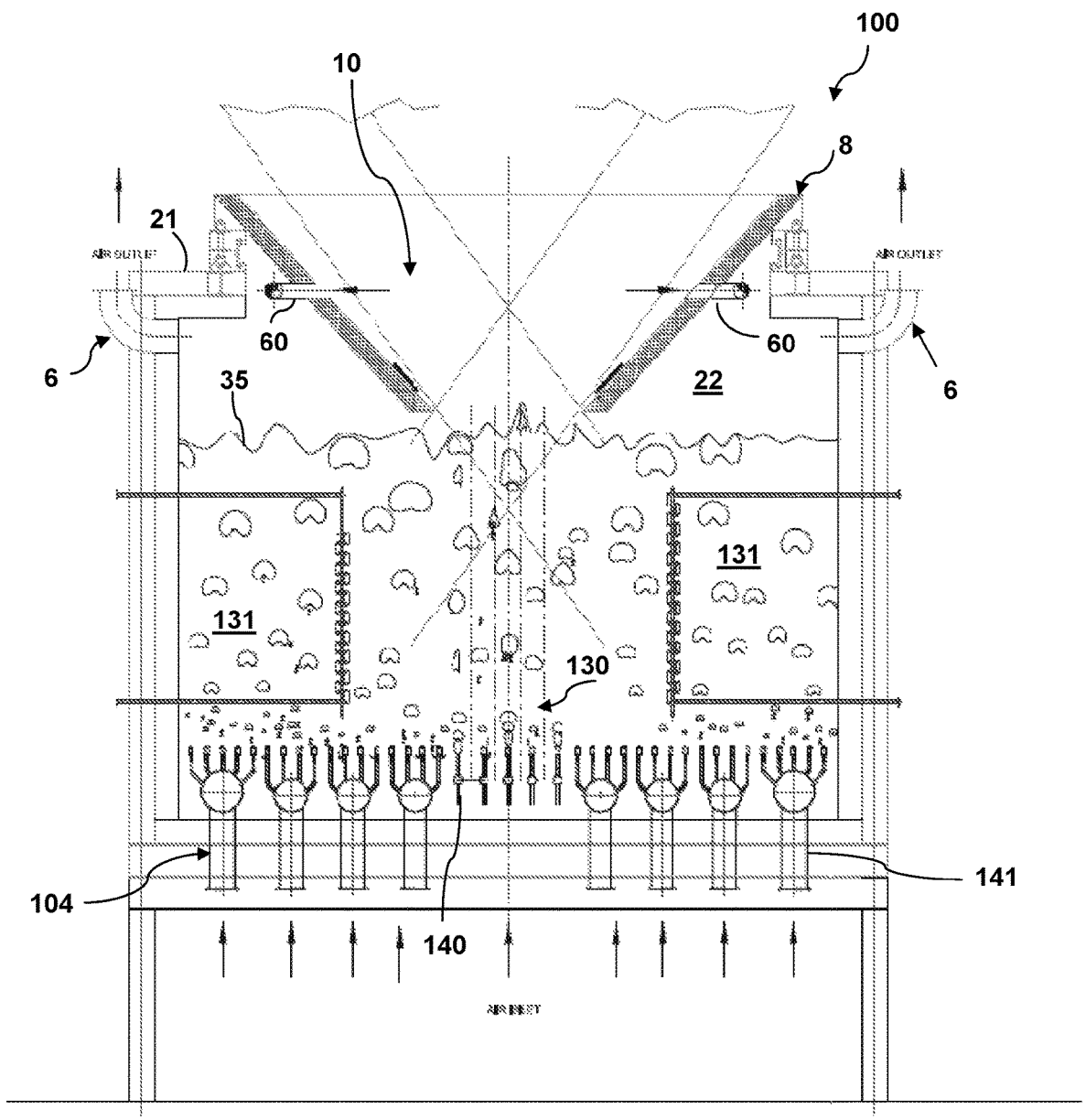
FIG. 2 shows a schematic view in longitudinal section of a device for storing and exchanging thermal energy of solar origin based upon a second preferred embodiment of the invention.

By now referring to FIGS. 2 and 2bis, a device based upon a second embodiment of the invention is designated as a whole with 100. The device 100 differs from the previously described device 1 in two main aspects.

One first difference lies in the fluid-dynamic regimen of the operating, or irradiated, region, herein designated with 130. In this case, the fluidization means, designated with 104, is configured to determine, in use, two different fluidization speeds within the operative region 130. In this way, in the latter a circulatory convective motion of solid particles is determined. In particular, in a central longitudinal subregion of the operative region 130 the speed of the particles is higher than that of the side longitudinal subregions. A fluid-dynamic regimen with coaxial beds with inner circulation is then established, or better circulating coaxial subregions of the bed, wherein the subregions are adjacent according to the longitudinal direction L. The above-mentioned convective motion, in the top portion of the adjacent subregions of the bed, pours the particles of the subregion with greater fluidization speed in the adjacent subregion with smaller fluidization speed and attracts particles of the latter within the subregion with greater speed in the lower portion of the adjacent subregions.

Such re-mixing of the particles of subregions allows a mass and thermal energy transfer in the whole volume of the operative region of the bed involved by the solar spot and it maximizes the surface of particles exposed to the concentrated solar radiation.

Even in this case feeding elements, respectively 140 e 141, are provided, arranged at the operative region 130 and the accumulation region 131. Even in this case, the feeding elements 140 and 141 can be different in number and/or structure, or having analogous structure, but different control, that is different fluidization parameters in terms of speed and/or flow.

A second difference of the device 100 with respect to the device 1 of the first embodiment consists in the presence of a shaped containment structure 8, arranged at the mouth of the irradiation opening 10, and in particular partially within the free space 22 of the compartment 20 and partially projecting towards the outside. The containment structure 8 has a through-opening, that is it has tubular structure, so as to allow the direct communication between inside and outside of the casing by means of irradiation opening 10.

The containment structure 8 defines a plenum chamber and then contributes to avoid or reduce outgoing of air and/or particles towards the outside.

In the present embodiment, the containment structure 8 has a tapered, in particular conical shape, with a section decreasing towards the inside of the casing 2. Such section of the containment structure allows not to interfere with the direction of the solar radiation concentrated by the dedicated optical system which in the present example is a beam-down optical system with arrangement of the heliostat field at the ground, preferably organized in sub-fields according to the cardinal directions.

Furthermore, at the walls of the structure 8 air-suction outlets 60 are obtained, or equivalent suction elements, which can be in communication with the environment of the freeboard that is they can be associated to a dedicated suction system. When in communication with the freeboard, such outlets 60 pours the sucked air into the space comprised within freeboard 35 and upper wall 21 of the casing 2. From this point, even this air flow is sucked by the already illustrated suction means 6.

Figure 3:
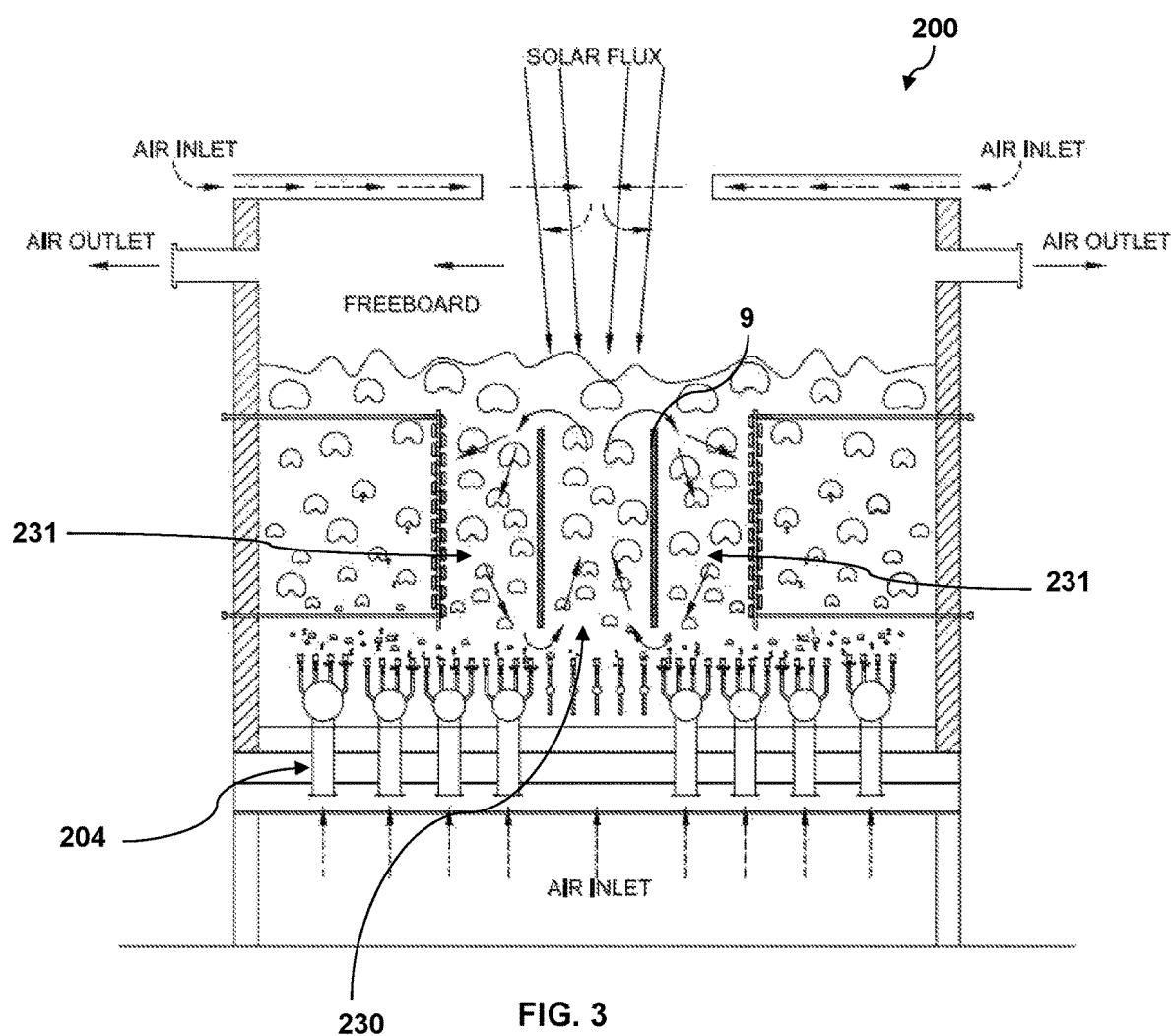
FIG. 3 shows a schematic view in longitudinal section of a device for storing and exchanging thermal energy of solar origin based upon a third preferred embodiment of the invention.

By referring to FIG. 3, a device based upon a third embodiment of the invention is designated as a whole with 200. The device 200 differs from the previously described device 1 due to the presence of one or more partitions 9 arranged to separate the operative region, herein designated with 230, from the accumulation region, herein designated with 231.

In case of cylindrical geometry of the compartment 20, one single partition 9, with cylindrical geometry too, can be provided. In case of polyhedral geometry of the compartment 22, several partitions with plane geometry can be provided.

Furthermore, the fluidization means, designated with 204, is configured to determine, in use, a different fluidization speed of the operative region 230 with respect to the accumulation region 231. In particular, a circulatory convective motion of particles between the central region 230 and the side region 231, and then an exchange of particles, is determined.

When the speed of the fluidization air of the operative region 230 is higher than the one of the adjacent accumulation region 231, the particles of the operative region 230 pour above the partition 9 in the adjacent accumulation region 231, by attracting particles from the bottom below the partition itself. This is the configuration shown in FIG. 3.

By reversing the size of the speeds of fluidization air belonging to the operative region 230 and to the accumulation region 231 a reversal of the recirculation of the particles with respect to the partition 9 is obtained.

Figure 4:
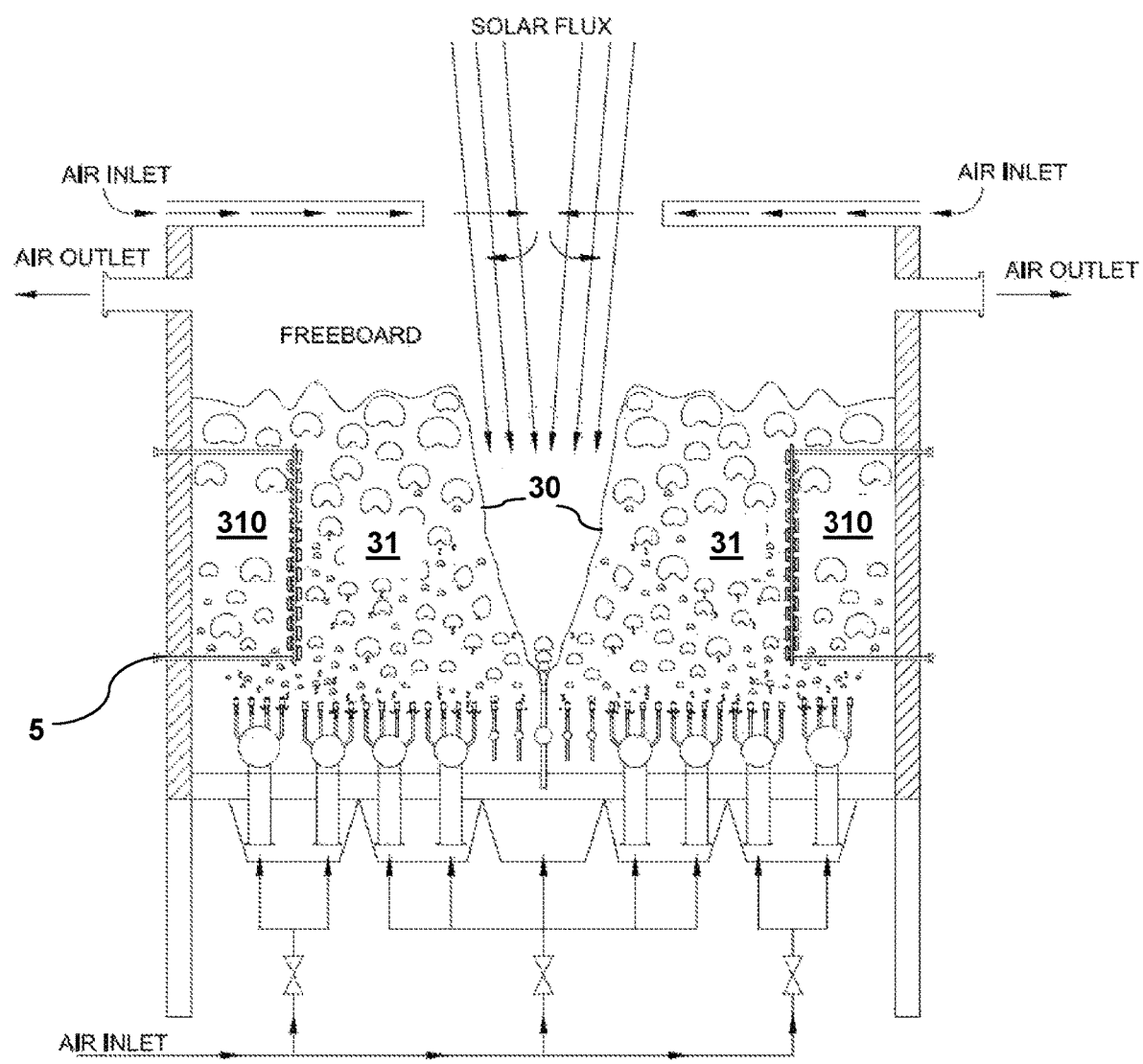
FIG. 4 shows a schematic view in longitudinal section of a device for storing and exchanging thermal energy of solar origin based upon a variant of the configuration of FIG. 1.

Based upon an embodiment variant thereto FIG. 4 refers, apart from the operative region 30 receiving the concentrated solar radiation and the accumulation region 31 adjacent thereto, the bed of particles even comprises an additional region 310, which can be called a thermal-exchange region, adjacent to the accumulation region, outside the latter. To such additional region 310 the thermal energy can be transferred, in fluidization regimen of the three regions or at least of the additional region and of the accumulation one. In such additional region the above-mentioned tube bundles 5 or means equivalent thereto can be housed.

In such configuration of the device, each portion of the bed of particles is active, that is it plays the specific function, when it is fluidized. In particular, for the above-mentioned additional region of the bed an independent fluidization is provided, so as to be able to manage separately the accumulation phase and the exchange phase.

The additional region 310 can be implemented as a subregion of the accumulation region in each one of the above-illustrated embodiments, which can be preferably actuated selectively in specific operating modes.

In all described embodiments and variants, the dimensioning of the operative region depends upon the quantity of thermal energy which such region has to absorb and upon the chemical-physical features of the particles constituting the granular bed. The modes of such dimensioning are known to a person skilled in the art and then one will not further dwell thereupon.

The device of the invention has modular nature, that is it is well suitable to be connected to one or more analogous devices in series or in parallel with respect to the thermal exchange.

Moreover, the above-mentioned types of devices according to the different described embodiments can be favourably associated for a greater flexibility in the production and/or operation of the industrial plant based upon several invention devices.

In all described embodiments and variants, the energy transport from the concentrated radiative beam to the fluidized bed is assigned to the granular material which becomes the primary carrier of the thermal energy, differently from the traditional receiving means with membrane or transparent window which, by interposing between the concentrated energy and the correlated heat carrier, determines a physical separation thereof.

The present invention has been sofar described with reference to preferred embodiments. It is to be meant that other embodiments belonging to the same inventive core may exist, as defined by the protective scope of the herebelow reported claims.

The invention claimed is:

1. A device configured for storage and exchange of thermal energy of solar origin, which device is configured to receive a concentrated solar radiation using an optical system, which device comprises:
    a casing which defines an internal compartment and has an irradiation opening configured to allow entry of the concentrated solar radiation, which irradiation opening puts in direct communication said internal compartment with the external environment being devoid, in use, of closure or screen means;
    a bed of fluidizable solid particles, received within said internal compartment of said casing, the fluidizable solid particles having an operative region directly exposed, in use, to the concentrated solar radiation that enters through said irradiation opening and a heat accumulation region adjacent to said operative region; and
    a fluidization system of said fluidizable solid particles, configured to feed a fluidizing gas within said internal compartment, which fluidization system is configured to determine a first fluid-dynamic regimen in said operative region different from a second fluid-dynamic regimen in said accumulation region,
    wherein the overall configuration is such that, in use, the particles of said operative region absorb thermal energy from the solar radiation and they give it to the particles of said accumulation region.

2. The device of claim 1, wherein said fluidization system is configured to determine, in use, the formation of a hollow volume in said operative region.

3. The device of claim 1, wherein said fluidization system is configured to determine, in use, at least two different fluidization speeds within said operative region.

4. The device of claim 1, wherein said fluidization system is configured to determine, in use, a circulatory convective motion of particles within said operative region.

5. The device of claim 1, wherein said fluidization system is configured to determine, in use, a fluid-dynamic regimen of spouted type in said operative region.

6. The device of claim 1, wherein said fluidization system is configured to determine, in use, a boiling bed regimen in said accumulation region.

7. The device of claim 1, comprising one or more separating partitions arranged between said operative region and said accumulation region.

8. The device of claim 1, wherein said fluidization system includes fluidizing gas feeding elements arranged at a lower base of said bed or of said casing.

9. The of claim 1, comprising suction system for suction of the fluidizing gas, arranged within said casing above a freeboard of said bed.

10. The device of claim 9, comprising elements of regenerative heat exchange between the fluidizing gas entering said casing by said fluidization system and the fluidizing gas outgoing from said casing by means of said suction system.

11. The device of claim 9, wherein said suction system is configured to extract from the device a flow of fluidizing gas equal to or higher than a flow rate of fluidization air fed into said bed.

12. The device of claim 1, comprising, above a freeboard of said bed a plenum chamber of a fluidization motion of the particles.

13. The device of claim 12, wherein said plenum chamber is defined by a calm space interposed between the freeboard of said bed and said upper wall of said casing.

14. The device of claim 1, comprising a shaped containment structure, configured to hold particles of said bed within said casing, which containment structure is arranged at said irradiation opening.

15. The device of claim 14, wherein said containment structure has a tapered shape, with a section decreasing towards the inside of said casing.

16. The device of claim 1, comprising an inletting system for introducing a containment gas, arranged in said casing above a freeboard of said bed which inletting means is configured to deliver a laminar flow of gas suitable to produce a barrier to the escape of particles towards the outside.

17. The device of claim 1, comprising heat exchange elements in which, in use, working fluid flows and arranged at said accumulation region of the bed.

18. A thermal energy production plant comprising:
at least a device for storage and exchange of thermal energy of solar origin of claim 1; and
an optical system configured to focus an incident solar radiation at said irradiation opening of said at least a device, wherein said optical system has a "beam down" configuration comprising one or more primary optical elements arranged on the ground and one or more secondary reflection optical elements arranged at a height.

19. A method for storage and exchange of thermal energy of solar origin, which method involves the irradiation of a fluidized bed of solid particles with a concentrated solar radiation using an optical system comprising using the device of claim 1.

20. The device of claim 1, wherein said irradiation opening is arranged at an upper wall of said casing.

21. A method for storage and exchange of thermal energy of solar origin, which method involves the irradiation of a fluidized bed of solid particles with a concentrated solar radiation using an optical system,
wherein said fluidized bed of solid particles is housed in a casing provided with an irradiation opening configured to allow entry of the concentrated solar radiation, which opening puts in direct communication the bed of particles with the external environment having no closure or screen means,
wherein said solid particles have an operative region directly exposed to the concentrated solar radiation that enters through said opening and a heat accumulation region adjacent to said operative region,
wherein said solid particles are fluidized in accordance with a first fluid-dynamic regimen obtained in said operative region different from a second fluid-dynamic regimen obtained in said accumulation region, and
wherein the overall configuration is such that, in use, particles of said operative region absorb thermal energy from the solar radiation and they give it to the particles of said accumulation region.

22. The method of claim 21, wherein said fluidization involves the formation of a hollow volume in said operative region.

23. The method of claim 21, wherein said fluidization determines at least two different fluidization speeds within said operative region.

24. The method of claim 21, wherein said fluidization determines a circulatory convective motion of particles within said operative region.

25. The method of claim 21, wherein said fluidization determines a regime of bed of spouted type in said operative region.

26. The method of claim 21, wherein said fluidization determines a boiling bed regimen in said accumulation region.

27. The device of claim 14, wherein said containment structure is arranged at said irradiation opening and at least partially protruding towards the outside with respect to said irradiation opening.

* * * * *